US009870263B2

(12) United States Patent
Bernardi et al.

(10) Patent No.: US 9,870,263 B2
(45) Date of Patent: Jan. 16, 2018

(54) SYSTEM VIRTUALIZATION INSTANCE MANAGEMENT FOR TERMINAL SESSIONS

(75) Inventors: Ara Bernardi, Mercer Island, WA (US); Sriram Sampath, Redmond, WA (US); John M. Sheehan, Somerville, MA (US); Tad Dennis Brockway, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 11/771,975

(22) Filed: Jun. 29, 2007

(65) Prior Publication Data
US 2009/0006503 A1    Jan. 1, 2009

(51) Int. Cl.
*G06F 17/30* (2006.01)
*G06F 9/50* (2006.01)

(52) U.S. Cl.
CPC ................... *G06F 9/5027* (2013.01)

(58) Field of Classification Search
CPC ................... G06F 17/30; G06F 17/00
See application file for complete search history.

(56) References Cited

U.S. PATENT DOCUMENTS

| | | | |
|---|---|---|---|
| 5,961,582 A | 10/1999 | Gaines | |
| 6,496,847 B1 | 12/2002 | Bugnion et al. | |
| 6,601,081 B1 | 7/2003 | Provino et al. | |
| 6,684,259 B1 * | 1/2004 | Discavage et al. | 719/316 |
| 6,760,804 B1 | 7/2004 | Hunt et al. | |
| 6,880,002 B2 * | 4/2005 | Hirschfeld | G06F 9/5077 709/223 |
| 7,028,305 B2 | 4/2006 | Schaefer | |
| 7,165,260 B2 | 1/2007 | Blaser et al. | |
| 7,650,639 B2 * | 1/2010 | Kramer et al. | 726/23 |
| 7,694,298 B2 * | 4/2010 | Goud | G06F 9/45537 703/24 |
| 7,694,328 B2 * | 4/2010 | Joshi | G06F 21/51 726/2 |
| 7,698,406 B2 * | 4/2010 | Rich et al. | 709/223 |

(Continued)

FOREIGN PATENT DOCUMENTS

WO    WO 2004088543 A1 *    10/2004    ............. G06F 17/30

OTHER PUBLICATIONS

Chiueh, Susanta Nanda Tzi-cker, and Stony Brook. "A survey on virtualization technologies." RPE Report (2005): 1-42.*

(Continued)

*Primary Examiner* — Farhan Syed
(74) *Attorney, Agent, or Firm* — Workman Nydegger (57) ABSTRACT

Terminal sessions providing remote access to functionality may be isolated from each other, as well as from the server system space, by being placed in system virtualization instances. Applications associated with terminal sessions may be allocated to system virtualization instances. In particular, system virtualization instances may be pre-instantiated, and applications may be dynamically allocated to the system virtualization instances, for example, according to a virtualization instance policy. The system virtualization instances may provide, in particular, an ability for terminal session components and associated applications to create, read, update and delete resources in a global name space of a host server without conflict, collision or other interference with each other or other server components.

20 Claims, 9 Drawing Sheets

(56) References Cited

U.S. PATENT DOCUMENTS

| | | | | |
|---|---|---|---|---|
| 7,779,091 | B2* | 8/2010 | Wilkinson | G06F 9/505 707/999.01 |
| 7,934,017 | B2* | 4/2011 | Wilkinson | G06F 9/505 709/230 |
| 7,934,020 | B1* | 4/2011 | Xu | G06F 9/485 709/223 |
| 8,010,701 | B2* | 8/2011 | Wilkinson | G06F 9/505 709/217 |
| 8,245,129 | B2* | 8/2012 | Wilkinson | G06F 9/505 715/236 |
| 8,326,993 | B2* | 12/2012 | Bernardi | H04L 63/104 709/227 |
| 8,505,006 | B1* | 8/2013 | Larkin | G06F 9/45537 718/1 |
| 8,706,833 | B1* | 4/2014 | Bergant | G06F 17/30162 709/214 |
| 8,732,308 | B1* | 5/2014 | Talwar | G06F 9/5077 709/226 |
| 2004/0054748 | A1* | 3/2004 | Ackaouy et al. | 709/214 |
| 2005/0091214 | A1* | 4/2005 | Probert | G06F 21/31 |
| 2005/0091658 | A1* | 4/2005 | Kavalam | G06F 21/31 718/104 |
| 2005/0114478 | A1* | 5/2005 | Popescu | H04L 12/1822 709/220 |
| 2005/0149726 | A1* | 7/2005 | Joshi | G06F 21/51 713/164 |
| 2005/0160251 | A1* | 7/2005 | Zur et al. | 712/1 |
| 2006/0123064 | A1 | 6/2006 | Kim et al. | |
| 2006/0146057 | A1 | 7/2006 | Blythe | |
| 2006/0184349 | A1* | 8/2006 | Goud | G06F 9/45537 703/24 |
| 2006/0248180 | A1* | 11/2006 | Bernardi | H04L 63/104 709/223 |
| 2007/0043860 | A1* | 2/2007 | Pabari | 709/224 |
| 2007/0239859 | A1* | 10/2007 | Wilkinson | G06F 9/505 709/220 |
| 2008/0034071 | A1* | 2/2008 | Wilkinson | G06F 9/505 709/220 |
| 2008/0133777 | A1* | 6/2008 | Wilkinson | G06F 9/505 709/249 |
| 2008/0147745 | A1* | 6/2008 | Wilkinson | G06F 9/505 |
| 2008/0147787 | A1* | 6/2008 | Wilkinson | G06F 9/505 709/203 |
| 2008/0263207 | A1* | 10/2008 | Popescu | H04L 12/1822 709/226 |
| 2008/0307414 | A1* | 12/2008 | Alpern | G06F 9/45558 718/1 |
| 2008/0320242 | A1* | 12/2008 | Jelinek | G06F 9/5077 711/153 |
| 2008/0320474 | A1* | 12/2008 | Jelinek | G06F 9/455 718/1 |
| 2012/0096364 | A1* | 4/2012 | Wilkinson | G06F 9/505 715/740 |

OTHER PUBLICATIONS

Yu, Yang, Fanglu Guo, Susanta Nanda, Lap-chung Lam, and Tzi-cker Chiueh. "A feather-weight virtual machine for windows applications." In Proceedings of the 2nd international conference on Virtual execution environments, pp. 24-34. ACM, 2006.*

"Application virtualization", available at least as early as Feb. 5, 2007, at <<http://www.softricity.com/products/virtualization.asp>>, Microsoft Corporation, 2007, pp. 1-4.

"Application Virtualization (A Technical Overview of the Thinstall Application Virtualization Platform)", available at least as early as Feb. 2, 2007, at <<http://thinstall.com/assets/docs/ThinstallTechnicalOverview_V2Apr06.pdf>>, Thinstall, 2006, pp. 1-11.

Nanda, et al., "A Survey on Virtualization Technologies", available at least as early as Feb. 2, 2007, at <<http://www.ecsl.cs.sunysb.edu/tr/TR179.pdf>>, pp. 1-42.

"How Terminal Service Works", Microsoft TechNet, retrieved on Jun. 21, 2007 at <<http://technet2.microsoft.com/windowsserver/en/library>>, 13 pages.

"Technical Overview of Terminal Services", Microsoft Windows Server 2003, Jan. 2005, 17 pages.

* cited by examiner

SYSTEM VIRTUALIZATION INSTANCE MANAGEMENT FOR TERMINAL SESSIONS

BACKGROUND

Remote access of computer functionality has become a common part of the way in which people use computers to work and play. There are a variety of remote access architectures, each with its benefits and drawbacks. The large installed base of computers, computer operating systems and computer applications that provide for remote access of functionality each support the various remote access architectures to some degree including no support and, in particular, partial support. The ambiguity of partial support can have significant associated costs, particularly for large organizations where it is not uncommon to undertake a substantial assessment process for each application and/or set of functionality to be offered to the organization's user base.

Partial support can be a particular problem with thin client remote access architectures. In such architectures, a relatively simple (i.e., thin) client provides a user interface to a server that provides the bulk of application functionality. A benefit commonly sought by those using such architectures is network management efficiency by relocating application components from a large number of client computers to a smaller set of server computers. However, such relocation can cause problems in cases where the application is not explicitly designed for relocation. For example, a computer operating system typically offers a variety of resources for applications, and some of those resources may be referenced by a name space that is global to the system (e.g., files referenced by a file system name space). An application may use the global name space in a way that is suitable for a client computer, but that causes problems such as name conflicts and/or collisions when used in the context of a server computer simultaneously executing multiple application instances.

It is desirable to solve such problems without explicit design and/or redesign at least because it can be costly, but also because the root causes can be subtle and the solutions difficult to fully test, particularly where problems arise from conflict between components from different vendors. However, unplanned name space and/or resource sharing can also create security risks ranging from denial of service to unauthorized access and information leakage, so that a robust solution is desirable to avoid such risks. Some conventional remote access architectures attempt to solve such problems by pre-sequencing applications (i.e., determining application resource usage in advance) but pre-sequencing can itself be a substantial undertaking and may not resolve some issues. It is sometimes possible to use brute force methods such as multiple operating systems or even multiple hardware subsystems to solve such problems, but a more efficient and flexible solution is desirable.

SUMMARY

Terminal sessions providing remote access to functionality may be isolated from each other, as well as from the server system space, by being placed in system virtualization instances. Applications associated with terminal sessions may be allocated to system virtualization instances. In particular, system virtualization instances may be pre-instantiated, and applications may be dynamically allocated to the system virtualization instances, for example, according to a virtualization instance policy. The system virtualization instances may provide, in particular, an ability for terminal session components and associated applications to create, read, update and delete resources in a global name space of a host server without conflict, collision or other interference with each other or other server components.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Same numbers are used throughout the disclosure and figures to reference like components and features.

DETAILED DESCRIPTION

A client seeking to access functionality hosted at a server may establish an access session (session, or terminal session where some component at the client corresponds to the "terminal") with the server. For each session, the server may instantiate one or more components to manage interaction with the client. This collection of components may also be called a session or terminal session when considered from a point of view of the server or an operating system of the server. In an embodiment of the invention, each such session is automatically isolated from others at the server, as well as from the server system space, by being placed within a system virtualization instance (or virtualization "bubble").

Furthermore, applications associated with sessions (e.g., instantiated and/or accessed by sessions) may be allocated to system virtualization instances, for example, according to a virtualization instance policy. The system virtualization instance to which an application is allocated need not be the same as the system virtualization instance containing its associated session. System virtualization instance numbers and lifetimes may be managed according to the virtualization instance policy, for example, for efficiency and/or security reasons. In particular, one or more system virtualization instances may be instantiated prior to instantiation of any session and/or application.

The system virtualization instances may provide, in particular, an ability for session components and applications to create, read, update and delete resources in a global name space of the host server without conflict, collision or other interference with each other or other server components. The system virtualization instances may be implemented with lightweight copy-on-write based technology. Applications need not be pre-sequenced to benefit from system virtualization instances, that is, applications may be non-sequenced or native applications.

Figure 1:
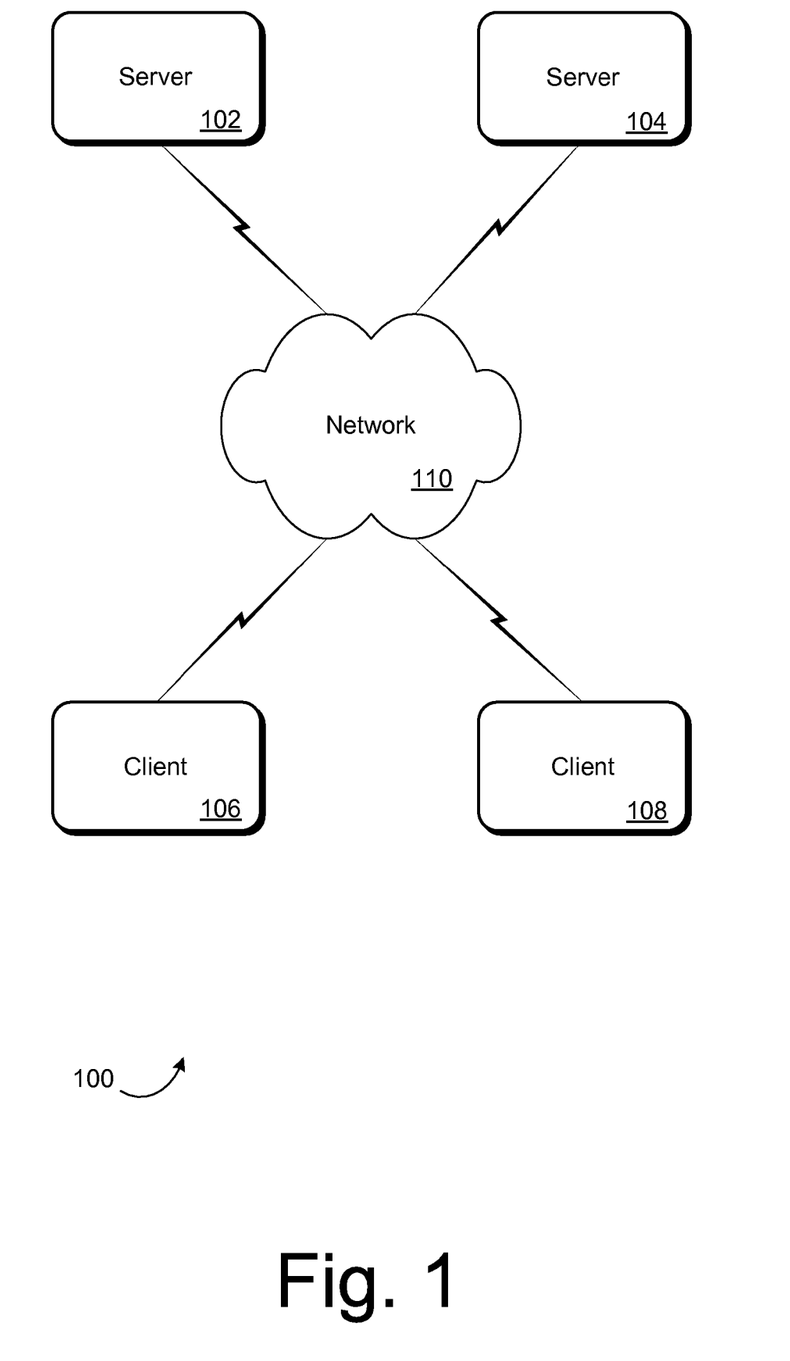
FIG. 1 is a schematic diagram depicting an example computing environment in accordance with an embodiment of the invention.

Before describing aspects of system virtualization instance management in accordance with an embodiment to the invention in more detail, it will be helpful to have reference to an example computing environment suitable for incorporating such an infrastructure. FIG. 1 depicts a suitable computing environment 100. The computing environment 100 depicts four computers 102, 104, 106, 108 connected by a network 110. For clarity, two of the computers 102, 104 are designated as servers, and two of the computers 106, 108 are designated as clients. Embodiments of the invention are not so limited and may include any suitable number of computers, servers and/or clients. Furthermore, as will be apparent to one of skill in the art, any of the computers 102, 104, 106, 108 may perform in multiple roles so that, for example, the computer 104 may change roles to become a client or act as both server and client simultaneously.

The computers 102, 104, 106, 108 may be any suitable computing device. Examples of suitable computing devices include mainframes, minicomputers, desktop computers, personal computers (PCs), workstations, portable computers, laptop computers, tablet computers, personal digital assistants (PDAs), mobile telephones, programmable consumer electronics devices, routers, gateways, switches, hubs, and suitable combinations thereof. The computers 102, 104, 106, 108 may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

The computers 102, 104, 106, 108 may include a wide variety of input/output (I/O) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the computers 102, 104, 106, 108 include any one or more of magnetic media (such as hard disks), optical media such as compact disks (CDs) and communication media. Communication media may include any one or more of wired communication media such as copper wire, coaxial cable and optical fiber, as well as wireless communication media such as electro-magnetic media including radio, microwave, infrared and laser light. In an embodiment of the invention, computer-readable media is tangible.

For clarity, embodiments of the invention may be described herein with reference to symbolic operations such as those of a computer programming language. Such symbolic operations and any data that they act upon correspond to physical states of components and changes in components of computing devices such as the computers 102, 104, 106, 108 in a manner well understood by one of skill in the art. In an embodiment of the invention, each such operation and its associated data may be fully implemented in hardware.

The network 110 may include any suitable network element and/or communication media. A computing device is an example of a suitable network element. The network 110 may incorporate any suitable network topology. Examples of suitable network topologies include simple point-to-point, star topology, self organizing peer-to-peer topologies and combinations thereof. Furthermore, the network 110 may employ any suitable network protocol to establish and/or maintain connectivity between the computers 102, 104, 106, 108. Examples of suitable network protocols include transmission control protocols (TCP), internet protocols (IP), remote desktop protocols (RDP), and suitable combinations thereof.

Figure 2:
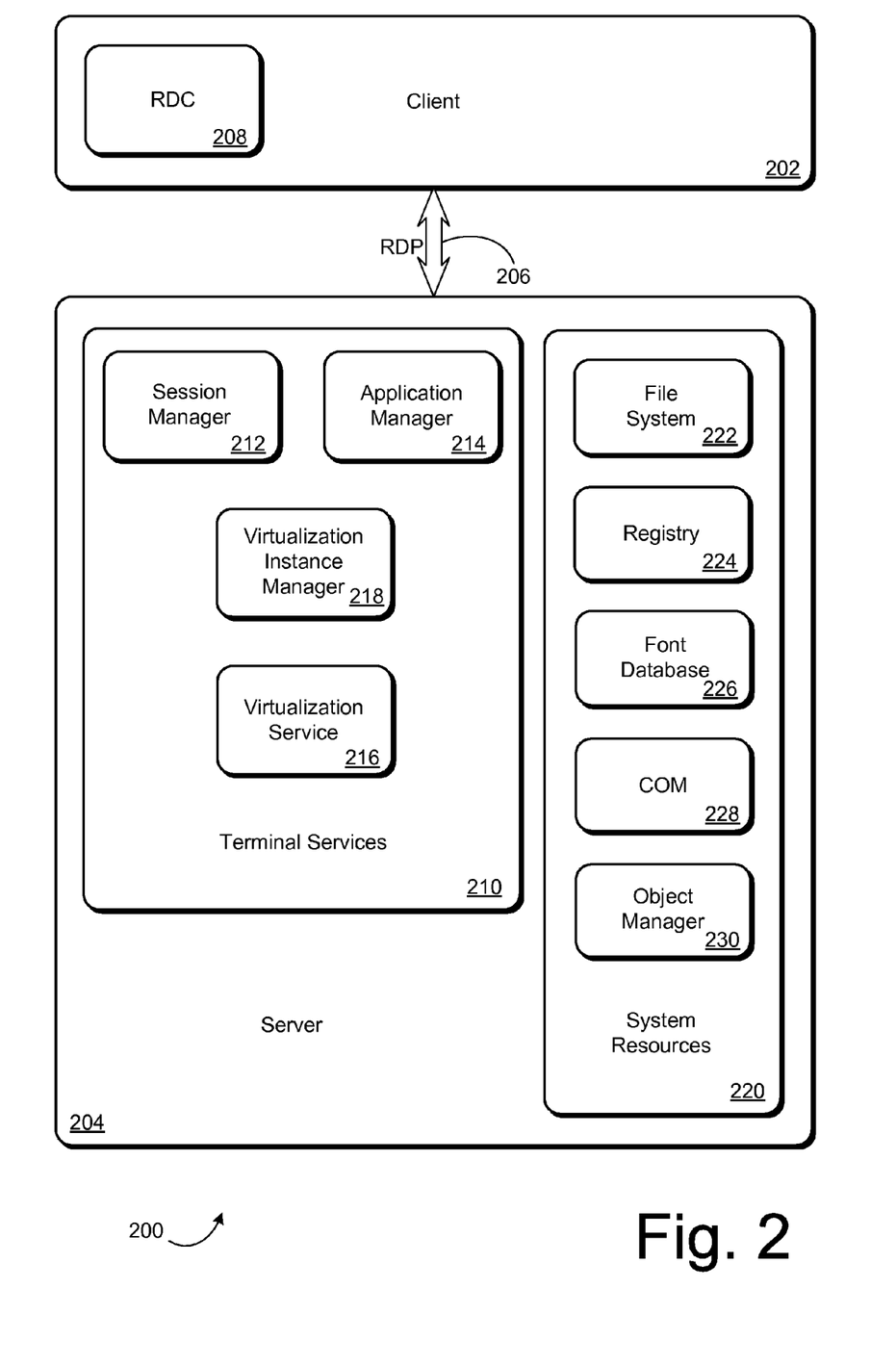
FIG. 2 is a schematic diagram depicting an example thin client remote access architecture in accordance with an embodiment of the invention.

The thin client remote access architecture will serve as a helpful example for illustrating aspects of embodiments of the invention. For clarity, the description will assume a thin client remote access architecture utilizing Microsoft® Windows® Terminal Services ("Terminal Services"). Terminal Services are well known in the art and, for clarity, only some aspects are highlighted in this description. FIG. 2 depicts an example thin client remote access architecture 200 in accordance with an embodiment of the invention. The example architecture 200 includes a client 202 communicating with a server 204 using a remote desktop protocol (RDP) 206. The client 202 is an example of the client 106 (FIG. 1), and the server 204 is an example of the server 104.

The client 202 may include a remote desktop connection (RDC) 208 capable of using the remote desktop protocol 206 to access terminal services 210 offered by the server 204. The terminal services 210 may include a session manager 212, an application manager 214, a virtualization service 216 and a virtualization instance manager 218. The server 204 may provide access to several system resources 220 such as a file system 222, a registry 224 of configuration information, a font database 226 of character fonts for a graphical user interface (GUI), common object model (COM) 228 facilities, and an object manager 230.

Figure 3:
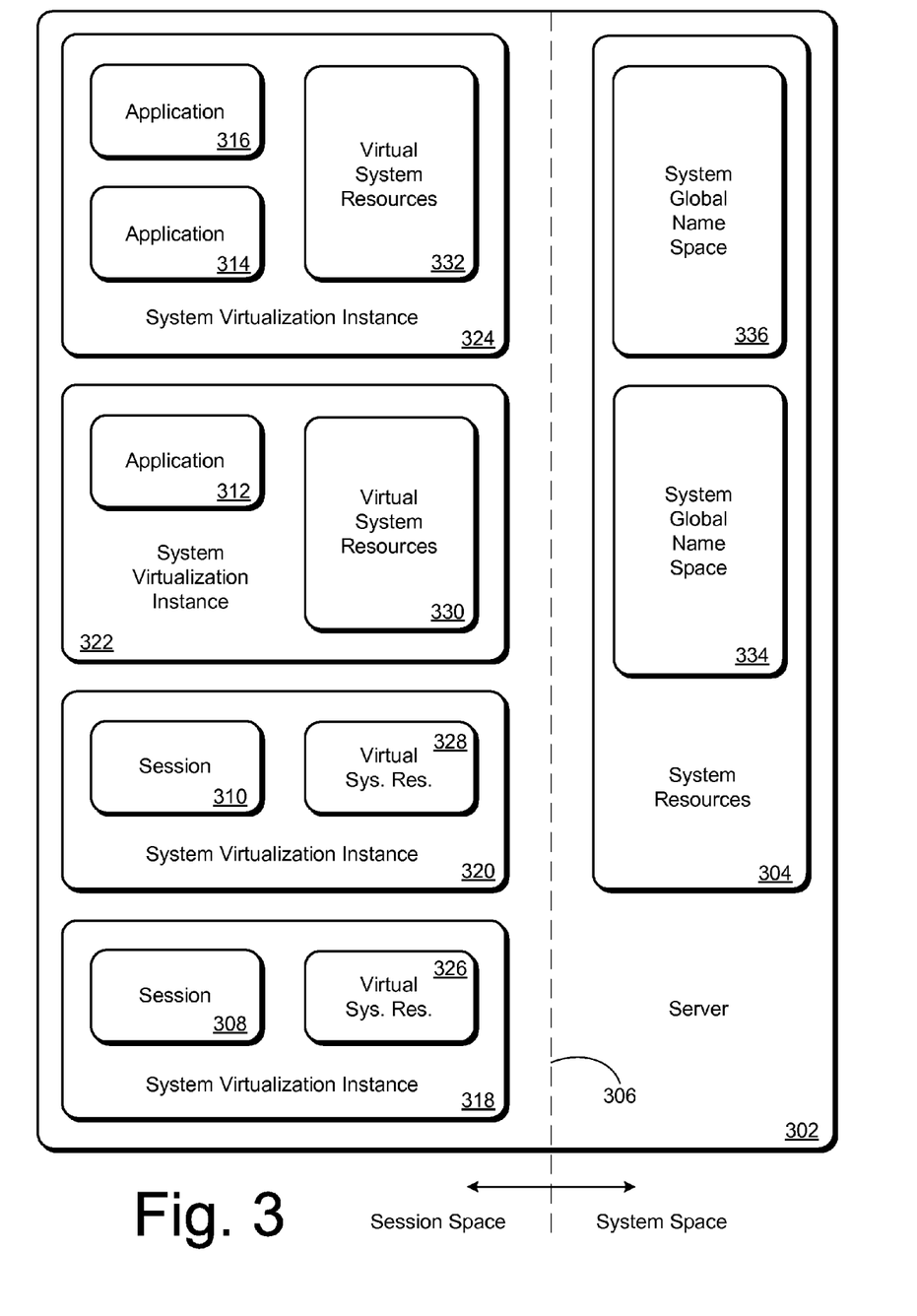
FIG. 3 is a schematic diagram depicting example structures created at a server in accordance with an embodiment of the invention.

Aspects of the architecture 200 are best described with reference to dynamic structures created during operation of the architecture 200. FIG. 3 depicts example structures created at a server 302 in accordance with an embodiment of the invention. The server 302 corresponds to the server 204 (FIG. 2). System resources 304 correspond to system resources 220. A dashed line 306 indicates a logical separation of system space and session space at the server 302. Session space contains objects instantiated by and/or on behalf of remote access sessions (i.e., terminal sessions). System space contains objects instantiated for local use, e.g., by the server 302 (i.e., the system).

The session manager 212 (FIG. 2) may process incoming requests from the remote desktop connection 208 to establish sessions (i.e., terminal sessions) such as sessions 308, 310 of FIG. 3. The session manager 212 may authenticate, or initiate authentication of, a user associated with the remote desktop connection 208, and may permit or deny session establishment based on user identity (or lack thereof). Sessions 308, 310 may include facilities for encoding a graphical user interface (such as a Windows® desktop) into the remote desktop protocol 206 for display by the remote desktop connection 208, as well as for decoding user actions indicated at the remote desktop connection 208. A typical remote desktop connection 208 corresponds to a single session (say session 308), so that the sessions 308, 310 may be assumed to correspond to remote desktop connections 208 at the clients 106, 108 (FIG. 1).

An example of a user action that may be indicated at the remote desktop connection 208 (FIG. 2) is a request to instantiate (open, load, associate with a process, begin a thread of execution, etc) an application such as the applications 312, 314, 316 of FIG. 3. The applications 312, 314, 316 may be any suitable computer application and, in this example, may be assumed to have an associated graphical user interface that may be displayed at the remote desktop connection 208. The application manager 214 may verify that the authenticated user associated with the remote desktop connection 208 has sufficient permission to instantiate the requested application.

The virtualization service 216 (FIG. 2) may instantiate system virtualization instances such as the system virtualization instances 318, 320, 322, 324 of FIG. 3. The virtualization service 216 may incorporate any suitable application virtualization service, for example, Microsoft® SystemGuard™. Application virtualization is well known in the art and, for clarity, only some aspects are highlighted in this description. In particular, the virtualization service 216 may incorporate application virtualization based on lightweight copy-on-write technology so that each system virtualization instance 318, 320, 322, 324 may efficiently include a virtual copy 326, 328, 330, 332 of the system resources 304.

Would-be changes by the sessions 308, 310 and the applications 312, 314, 316 to the system resources 304 (e.g., modifiable system resources) may be redirected by the associated system virtualization instance 318, 320, 322, 324 (as supported by the virtualization service 216 of FIG. 2) as changes to the appropriate virtual copy 326, 328, 330, 332. In particular, modifications to system global name spaces 334, 336 of the system resources 304 (i.e., name spaces that are global to the system, in this example the server 302) may be redirected to be changes to virtual replicas of the name spaces 334, 336 in the virtual system resource copies 326, 328, 330, 332 (e.g., virtual copies of the modifiable system resources), thereby avoiding name space conflicts and/or collisions. In an embodiment of the invention, use of the system virtualization instances 318, 320, 322, 324 enhances the separation of system space and session space which, in turn, enhances security.

Although, for clarity, only two system global name spaces 334, 336 are depicted in FIG. 3, each embodiment of the invention is not so limited, and the system resources 304 may include any suitable number of system global name spaces. In particular, each of the example system resources 220 depicted in FIG. 2 may have an associated system global name space such as the system global name spaces 334, 336 of FIG. 3. However, although logically distinct, name spaces such as the system global name spaces 334, 336 may have dependencies. For example, the common object model 228 facilities may use the configuration registry 224 which may, in turn, use the file system 222, and these dependencies may induce dependencies in corresponding, logically distinct, name spaces.

The virtualization instance manager 218 (FIG. 2) may manage the number and lifetimes of the system virtualization instances 318, 320, 322, 324 according to a virtualization instance policy. In particular, the virtualization instance policy may indicate that one or more of the system virtualization instances 318, 320, 322, 324 be instantiated prior to the instantiation of the sessions 308, 310 and/or applications 312, 314, 316. In an embodiment of the invention, such pre-instantiation of system virtualization instances enhances system (in this example server 302) performance, for example, responsiveness to clients 106, 108 (FIG. 1).

In addition, the virtualization instance manager 218 (FIG. 2) may allocate applications 312, 314, 316 to particular system virtualization instances 322, 324 according the virtualization instance policy. In the example depicted in FIG. 3, application 312 has been allocated to the system virtualization instance 322, and the applications 314, 316 have been allocated to the system virtualization instance 324. The virtualization instance manager 218 is described in more detail below with reference to FIG. 4.

In the example depicted in FIG. 2, the session manager 212, the application manager 214, the virtualization instance manager 218, and the virtualization service 216 are incorporated into the terminal services 210 aspect of the server 204, however, each embodiment of the invention is not so limited. For example, the application manager 214 and the virtualization service 216, in particular, need not be considered a part of the terminal services 210, although, in an embodiment of the invention, the terminal services 210 will have reference to the application manager 214 and the virtualization service 216. In addition, the virtualization instance manager 218 may be incorporated into the session manager 212.

Figure 4:
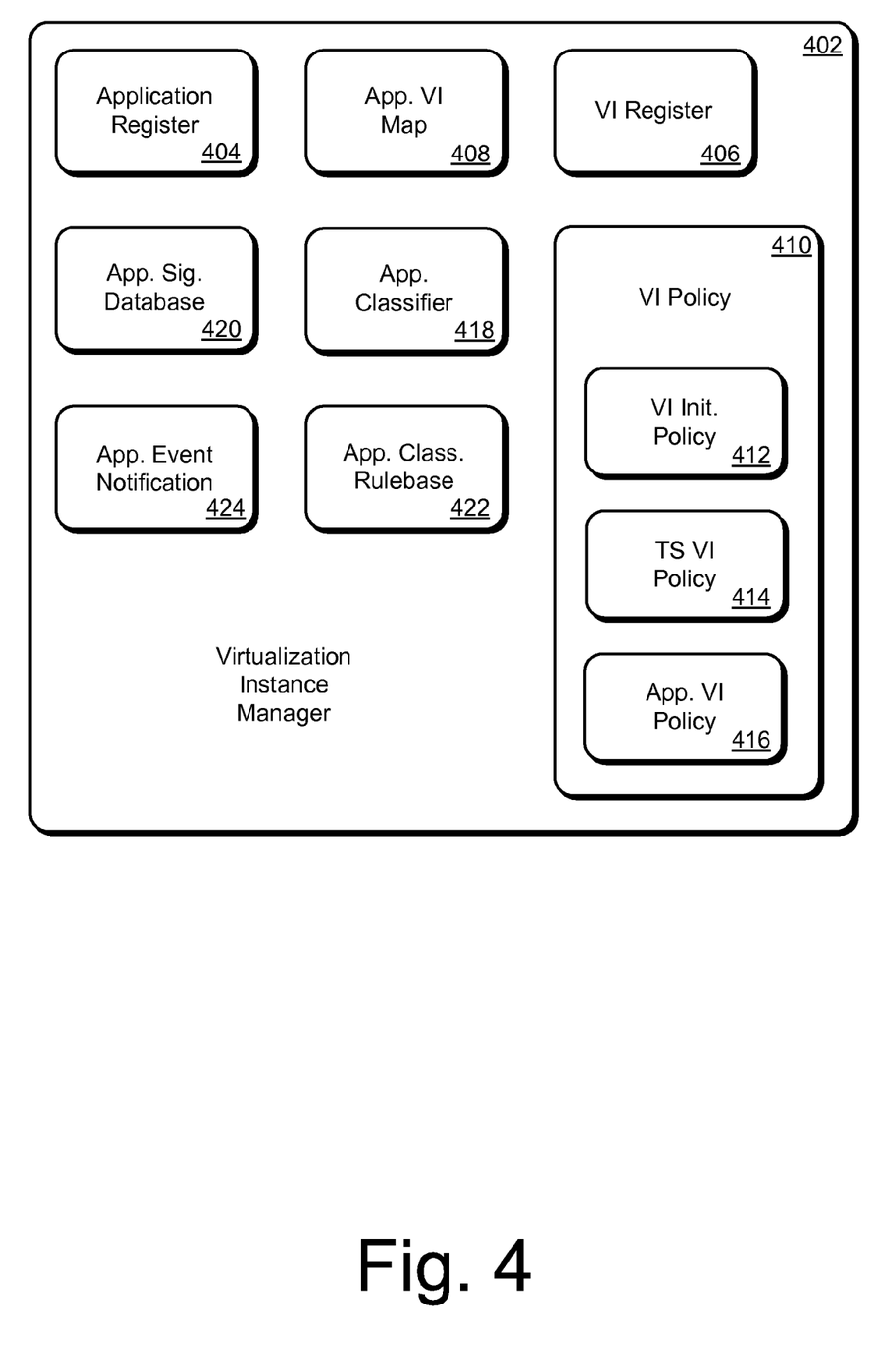
FIG. 4 is a schematic diagram depicting an example virtualization instance manager architecture in accordance with an embodiment of the invention.

The virtualization instance manager 218 (FIG. 2) may provide for flexible and efficient management of system virtualization instances such as system virtualization instances 318, 320, 322, 324 of FIG. 3. FIG. 4 depicts an example architecture for a virtualization instance manager 402 in accordance with an embodiment of the invention. The virtualization instance manager 402 is an example of the virtualization instance manager 218.

The virtualization instance manager 402 may include an application register 404 and a virtualization instance (VI) register 406. The application register 404 may include an entry for each session space application such as the applications 312, 314, 316 of FIG. 3. Each application in the application register 404 may be associated with a unique application identifier, for example, assigned by the application manager 214 (FIG. 2). The virtualization instance register 406 may include an entry for each session space system virtualization instance such as the system virtualization instances 318, 320, 322, 324. Each system virtualization instance in the virtualization instance register 406 may be associated with a unique virtualization instance identifier, for example, assigned by the virtualization instance manager 402 or the virtualization service 216.

The virtualization instance manager 402 may further include an application-virtualization instance map 408. The application-virtualization instance map 408 may maintain one or more associations between applications registered with the application register 404 and system virtualization instances registered with the virtualization instance register 406. For example, application-virtualization instance map 408 may include a map showing which system virtualization instance contains a given application and/or a map showing which applications, if any, are contained by a given system virtualization instance.

The virtualization instance manager 402 may instantiate system virtual instances 318, 320, 322, 324 (FIG. 3) and allocate sessions 308, 310 and applications 312, 314 316 to particular system virtualization instances 318, 320, 322, 324 according to a virtualization instance (VI) policy 410. The virtualization instance policy 410 may include a virtualization instance initialization (VI Init.) policy 412, a terminal session virtualization instance (TS VI) policy 414 and an application virtualization instance (App. VI) policy 416. The virtualization instance initialization policy 412 may specify one or more system virtual instances that are to be pre-instantiated (i.e., prior to session and/or application instantiation) when the virtualization instance manager 402 is initialized. The terminal session virtualization instance policy 414 may specify how sessions 308, 310 are to be allocated to system virtualization instances 318, 320, 322, 324. The application virtualization instance policy 416 may specify how applications 312, 314 316 are to be allocated to system virtualization instances 318, 320, 322, 324. For example, policy 410, 412, 414, 416 may include statements and/or expressions corresponding to statements and/or expressions of a programming language or any suitable specification language.

The application virtualization instance policy 416 may specify that applications 312, 314 316 be allocated to system virtualization instances 318, 320, 322, 324 based on an application virtualization classification. The application virtualization classification of a particular application may be determined by an application classifier 418 of the virtualization instance manager 402. The application classifier 418 may determine the application virtualization classification of a particular application based on an application signature of the application. The application classifier 418 may determine the application signature based on application characteristics provided by and/or extracted from a particular application. The application classifier 418 may use an application signature database 420 to lookup an application signature corresponding to a particular application given suitable application characteristics. The application signature database 420 need not be implemented with a full-weight database component, but may be implemented with any data collection that may be suitably searched.

The application classifier 418 may use an application classification rulebase 422 to determine an application classification corresponding to a given application signature. The application classification rulebase 422 may further contain rules for classifying applications for which an application signature cannot be determined. The application classification rulebase 422 may further contain a default classification rule, for example, a rule corresponding to "all applications not otherwise classified are to be allocated to a default system virtualization instance." The rulebase may include rules specified with statements and/or expressions corresponding to statements and/or expressions of a programming language or any suitable rule specification language.

The virtualization instance manager 402 may subscribe to application events corresponding to significant application state changes such as successful application instantiation and application exit. For example, the virtualization instance manager 402 may provide the application manager 214 (FIG. 2) with a reference to an application event notification module 424, and the application manager 214 may notify the virtualization instance manager 402 with a notify function of the application event notification module 424. For example, the virtualization instance manager 402 may update the application register 404 and/or the application-virtualization instance map 408 in response to application events. The virtualization instance manger 402 may include a similar component for receiving virtualization instance events, for example, from the virtualization service 216, however, in this example, the virtualization instance manager 402 obtains a reference to the virtualization service 216 at initialization and controls system virtualization instance numbers and lifetimes directly. The virtualization instance manager 402 may therefore update the virtual instance register 406 and the application-virtual instance map 408 as part of instantiating and/or deleting a particular system virtualization instance.

Figure 5:
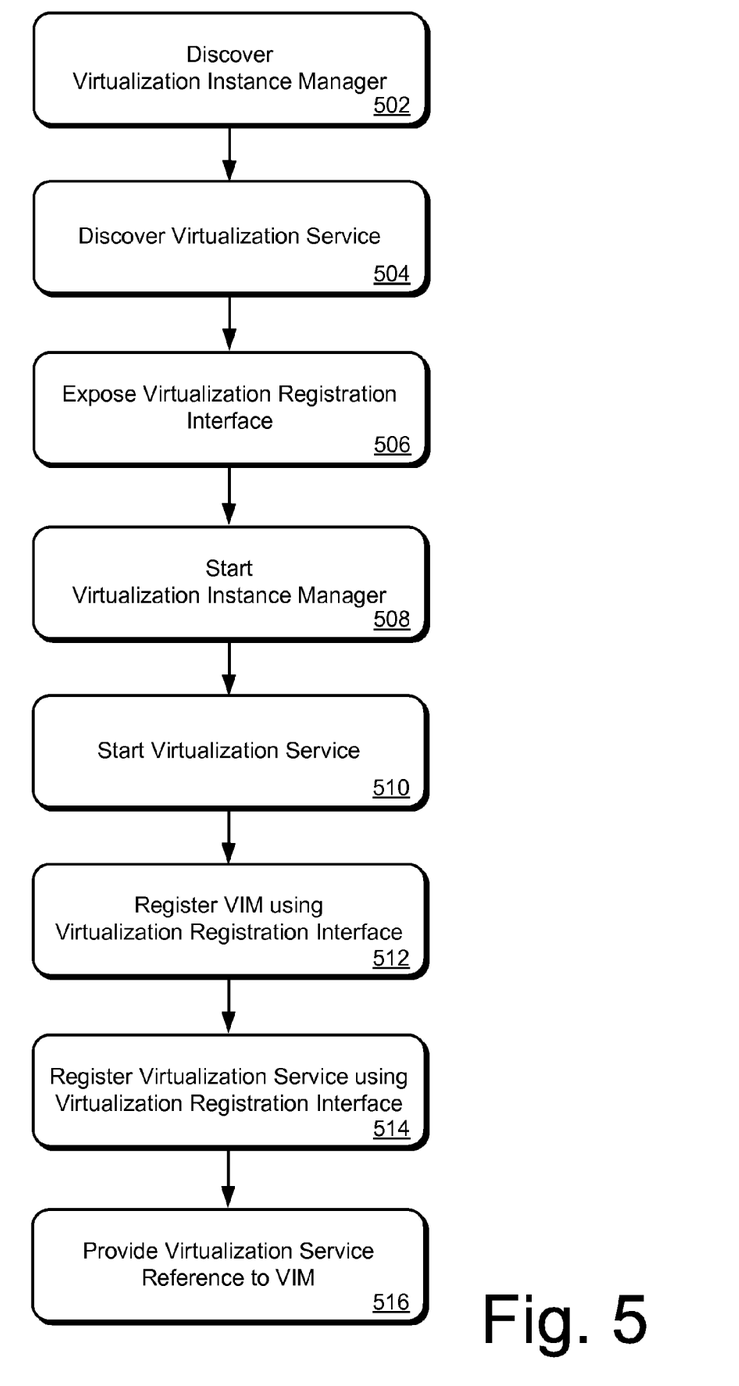
FIG. 5 is a flowchart depicting example steps for initializing terminal services in accordance with an embodiment of the invention.

Having described example architectures in accordance with an embodiment of the invention, the description now turns to procedures that may be performed by components of such architectures. FIG. 5 depicts example steps that may be performed to initialize terminal services 210 (FIG. 2) incorporating system virtualization instance management. This example assumes that both the virtualization instance manager 218 and the virtualization service 216 are independent system components.

At step 502, the virtualization instance manager (VIM) 218 (FIG. 2) may be discovered. At step 504, the virtualization service 216 may be discovered. For example, the session manager 212 may use one or more system resources 220 to discover the virtualization instance manager 218 and/or the virtualization service 216. Steps 502 and 504 may occur during an operating system boot process. In an embodiment of the invention, early discovery and initialization of the virtualization instance manager 218 and virtualization service 216 contributes to securing server session space.

The session manager 212 (FIG. 2) may include a virtualization registration interface to enable the virtualization instance manager 218 and/or the virtualization service 216 to register with the session manager 212. At step 506, the virtualization registration interface may be exposed, that is, made publicly available to other server 204 components, for example, using one of the system resources 220. Once the virtualization registration interface is exposed, it may be found by the virtualization instance manager 218 and/or the virtualization service 216 along with other publicly available interfaces.

At step 508, the virtualization instance manager 218 (FIG. 2) may be started. At step 510, the virtualization service 218 may be started. For example the virtualization instance manager 218 and the virtualization service 218 may be started by the session manager 212.

At step 512, the virtualization instance manager 218 (FIG. 2) may be registered with the session manager 212 using the virtualization registration interface. For example, the virtualization instance manager 218 may register itself with the session manager 212. At step 514, the virtualization service 216 may be registered with the session manager 212 using the virtualization registration interface. For example, the virtualization service 216 may register itself with the session manager 212.

At step 516, the virtualization instance manager 218 (FIG. 2) may be provided with a reference to the virtualization service 216. For example, the session manager 212 may provide the virtualization service 216 reference to the virtualization instance manager 218. The reference may be any suitable programmatic reference that enables the virtualization instance manager 218 to access the functionality of the virtualization service 216. Once registered with the session manager 212, the session manager 212 may have access to virtualization instance manager 218 and/or virtualization service 216 functionality, however, in an embodiment of the invention, the session manager 212 accesses virtualization service 216 functionality using the virtualization instance manager 218.

The example depicted in FIG. 5 assumes that both the virtualization instance manager 218 (FIG. 2) and the virtualization service 216 are independent system components, however, as described above, each embodiment of the invention is not so limited. In particular, the virtual instance manager 218 may be incorporated into the session manager 212. In such a case, the session manager 212 need not discover or start the virtualization instance manager 218, or require the virtualization instance manager 218 to register using the virtualization registration interface, that is, steps 502, 508 and 512 are not required. In another alternate case, steps 502, 504, 506, 508, 510 and 516 may be performed by a component other than the session manager 212, for example, an initialization (or boot) component of the server 204, and the registration steps 512 and 514 may be with another terminal services 210 component that also starts and configures the session manager 212. The application manager 214 may include similar facilities for virtualization instance manager 218 and/or virtualization service 216 registration, or the application manager 214 may access virtualization instance manager 218 functionality through the session manager 212.

Figure 6:
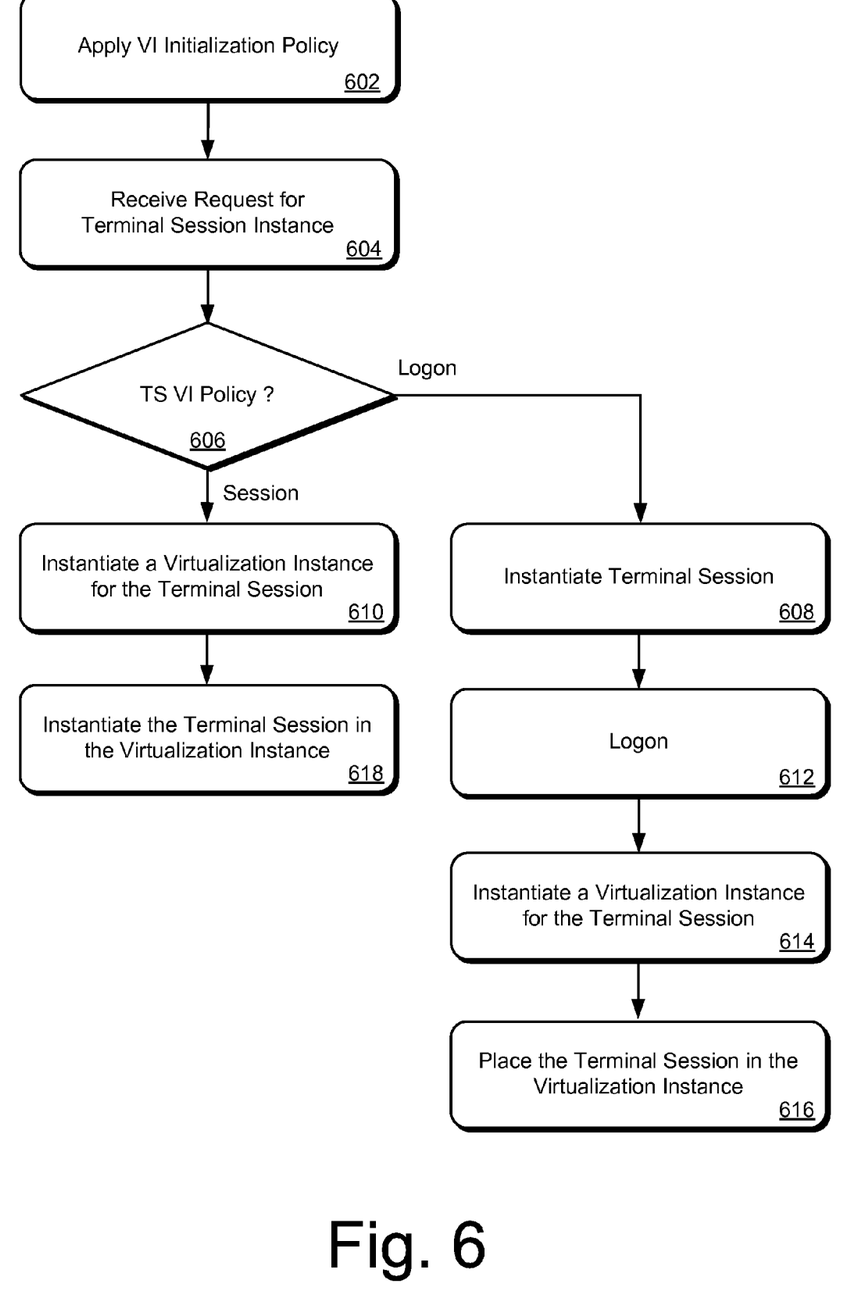
FIG. 6 is a flowchart depicting example steps for system virtualization instance management in accordance with an embodiment of the invention.

Having successfully initialized, the terminal services 210 may begin system virtualization instance management. FIG. 6 depicts example steps for system virtualization instance management in accordance with an embodiment of the invention. At step 602, the virtualization instance initialization policy 412 (FIG. 4) may be applied. For example, as part of initialization the virtualization instance manager 218 (FIG. 2) may instruct the virtualization service 216 to instantiate one or more of the system virtualization instances 318, 320, 322, 324 (FIG. 3) in advance of the instantiation of the sessions 308, 310 and/or the applications 312, 314, 316. Step 602 may even occur as part of a boot process of the operating system of the server 204.

At step 604, a request may be received to instantiate a terminal session instance such as one of the sessions 308, 310 (FIG. 3). For example, a request to establish a session, originating with the remote desktop connection 208 (FIG. 2), may be received by the session manager 212. At step 606, the virtualization instance policy 410 (FIG. 4) with respect to terminal sessions may be determined. For example, the virtual instance manager 402 may examine and/or apply the terminal session virtualization instance policy 414 to determine if system virtualization instances are to be instantiated for terminal sessions at terminal session instantiation or, for example, not until after successful logon. If it is determined that system virtualization sessions are not to be instantiated until after successful logon, a procedure incorporating the steps depicted in FIG. 6 may progress to step 608. Otherwise, the procedure may progress to step 610.

At step 608, a terminal session may be instantiated. For example, the session manager 212 (FIG. 2) may instantiate a terminal session such as session 308 (FIG. 3) with sufficient functionality to enable the remote desktop connection 208 to attempt to logon to (i.e., authenticate with) the server 204 with a graphical user interface. At step 612, the terminal session requestor may logon. For example, the remote desktop connection 208 may successfully authenticate with to the server 204.

At step 614, a system virtualization instance (virtualization instance) may be instantiated for the terminal session. For example, the virtualization instance manager 218 (FIG. 2) may instruct the virtualization service 216 to instantiate the system virtualization instance 318 (FIG. 3). The system virtualization instance 318 may be presumed to instantiate successfully, and at step 616, the terminal session may be placed within the system virtualization instance 318. For example, the virtualization instance manager 218 may instruct the virtualization service 216 to place the terminal session instantiated at step 608 within the system virtualization instance 318 (the terminal session thus becoming the session 308).

Returning to step 610, no terminal session nor system virtualization instance has yet been instantiated in response to the request of step 604. At step 610, a system virtualization instance may be instantiated for the requested terminal session. For example, the virtualization instance manager 218 (FIG. 2) may instruct the virtualization service 216 to instantiate the system virtualization instance 320 (FIG. 3). At step 618, the requested terminal session may be instantiated within the system virtualization instance that was instantiated at step 610. For example, the session manager 212 may instantiate the session 310 within the system virtualization instance 320.

Figure 7:
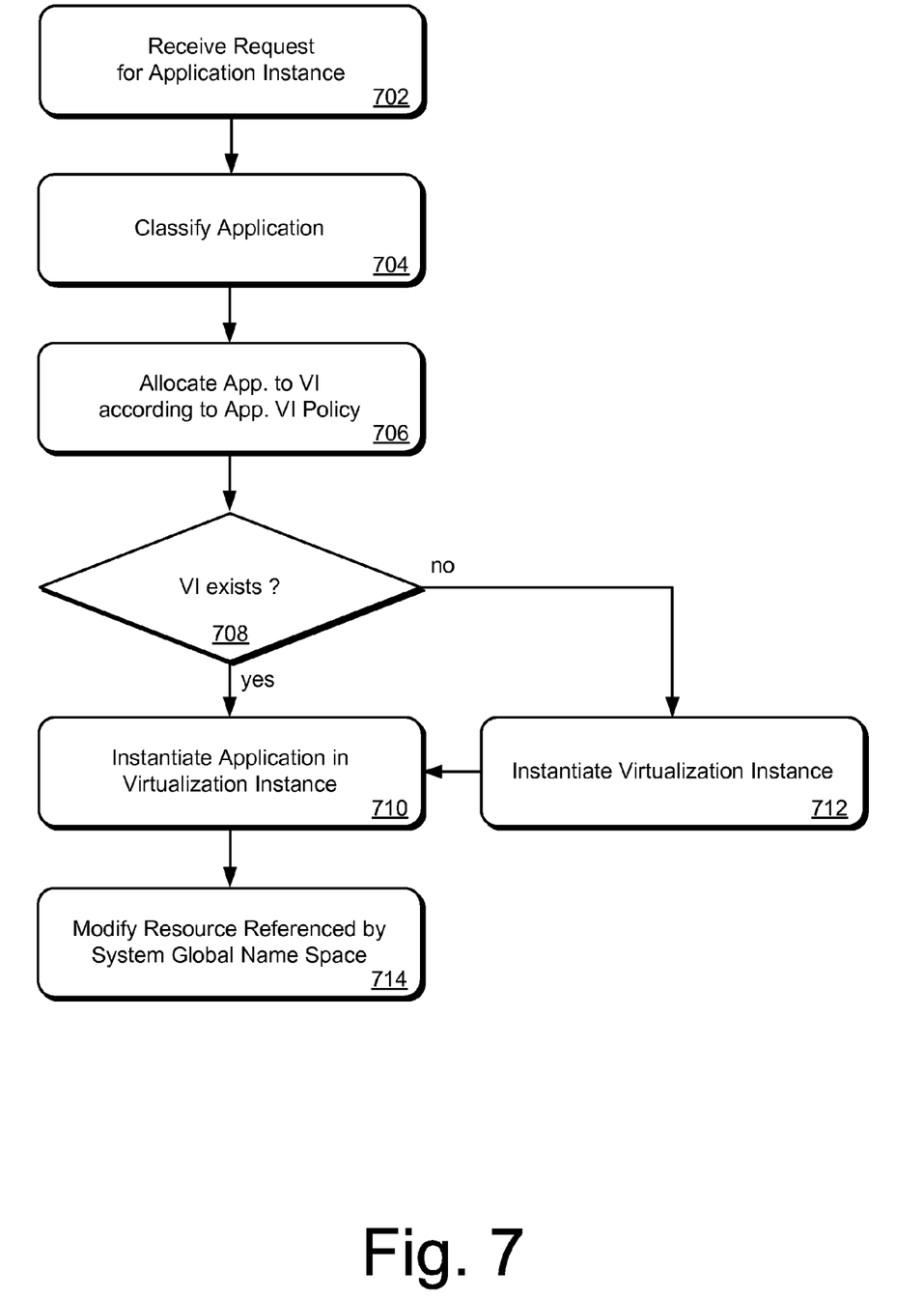
FIG. 7 is a flowchart depicting further example steps for system virtualization instance management in accordance with an embodiment of the invention.

The steps depicted by FIG. 6 perform system virtualization instance management related to the virtualization instance initialization policy 412 (FIG. 4) and the terminal session virtualization instance policy 414. FIG. 7 depicts example steps for system virtualization instance management related to the application virtualization instance policy 416. At step 702, a request may be received to instantiate an application instance. For example, the remote desktop connection 208 (FIG. 2) may have established the session 310 (FIG. 3) with the server 204, and the application manager 214 may receive the request from within the session 310 in response to a user action performed at the client 202.

At step 704, the application associated with the request may be classified for purposes of system virtualization instance management. For example, the virtualization instance manager 218 (FIG. 2) may determine a virtualization classification for the application using the application classifier 418 (FIG. 4). Example steps for application virtualization classification are described below in more detail with reference to FIG. 8.

At step 706, the requested application may be allocated to a particular system virtualization instance (VI) in accordance with the application virtualization instance policy 416 (FIG. 4). For example, the virtualization instance manager 218 (FIG. 2) may determine, based on the application virtualization classification determined at step 704 and the application virtualization instance policy 416, that the requested application should be allocated to the system virtualization instance 324 (FIG. 3).

At step 708, it may be determined if the system virtualization instance to which the request application was allocated at step 706 exists (i.e., has been instantiated). For example, the virtualization instance manager 218 (FIG. 2) may check the virtualization instance register 406 (FIG. 4) for the allocated system virtualization instance 324 (FIG. 3). If the allocated system virtualization instance does exist, a procedure incorporating the steps depicted in FIG. 7 may progress to step 710. Otherwise, the procedure may progress to step 712. At step 712, the allocated system virtualization instance may be instantiated. For example, if the virtualization instance register 406 does not include the system virtualization instance 324, the virtualization instance manager 218 may instruct the virtualization service to create the system virtualization instance 324.

At step 710, the requested application may be instantiated in the allocated system virtualization instance. For example, the virtualization instance manager 218 (FIG. 2) may provide the application manager 214 with a reference to the system virtualization instance 324 (FIG. 3) in which to instantiate the requested application 314. Alternatively, the application 314 may be instantiated before step 704 by the application manager 214, the application manager 214 may notify the virtualization instance manager 218 of the successful application instantiation (e.g., with the application event notification module 424 of FIG. 4) and, at step 710, the virtualization instance manager 218 may instruct the virtualization service 216 to place the application 314 within the system virtualization instance 324.

At step 714, a resource referenced by a system global name space may be modified. Such a resource can be referred to as a "modifiable system resource." For example, the newly instantiated application 314 (FIG. 3) may create a top level (i.e., system global) event named "MyEvent" in the system global name space 336 associated with the object manager 230 (FIG. 2). "MyEvent" can be an example of a modifiable system resource. If the application 314 wasn't contained by the system virtualization instance 324, the event creation attempt might have conflicted with a same named event created by some other application such as application 312. However, because the application 314 is contained in the system virtualization instance 324, the event is instead created in the virtual copy 332 of the system resources 304 and no conflict occurs. Conflict with application 316 might still be possible, however, in this example, it may be assumed that applications 314 and 316 have been allocated to the same system virtualization instance 324 by the virtualization instance manager 218 because their determined application virtualization classifications ensure that the are compatible and that no such conflicts will occur.

Figure 8:
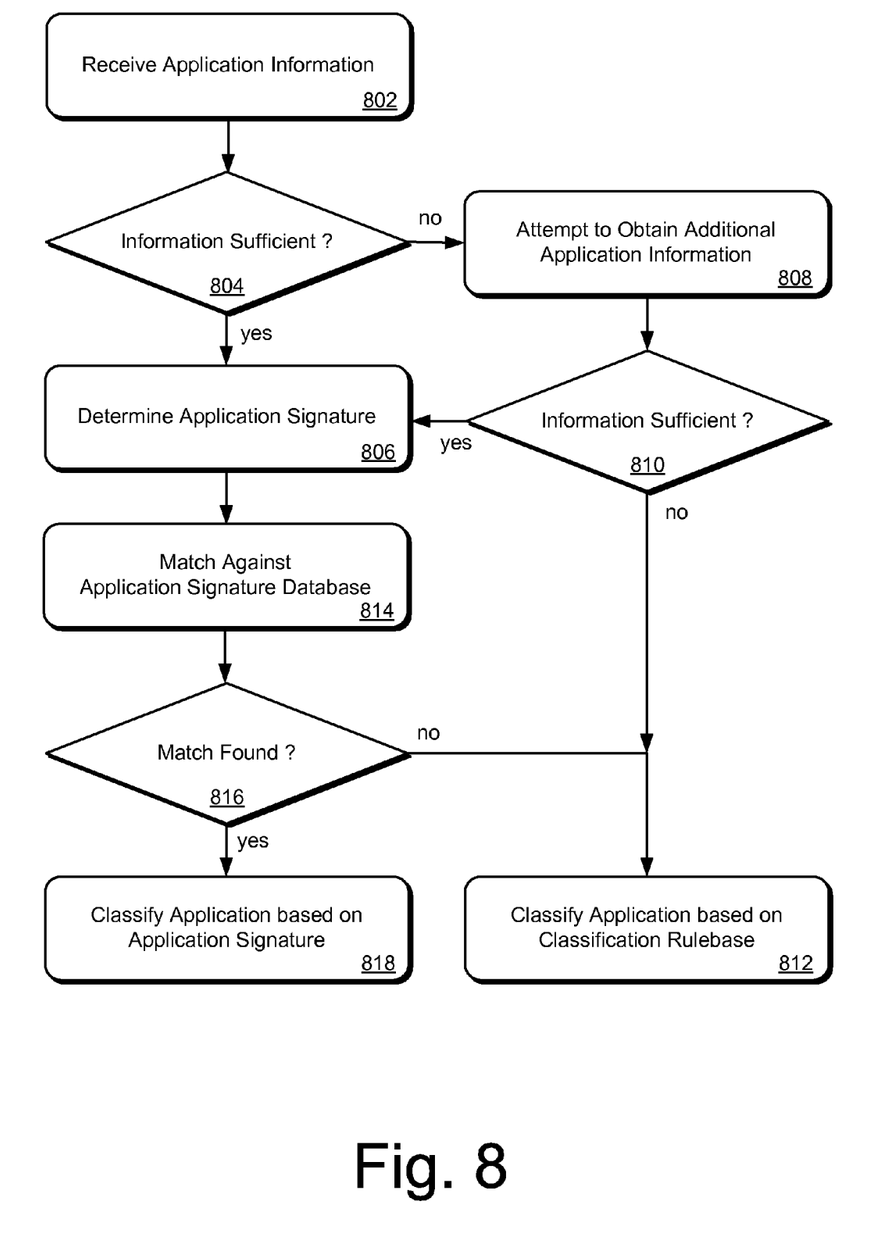
FIG. 8 is a flowchart depicting example steps for determining a virtualization classification of an application in accordance with an embodiment of the invention.

The virtualization classification for an application, for example, as determined by the application classifier 418 (FIG. 4), in combination with the application virtualization instance policy 416, may determine the system virtualization instance to which the application is allocated by the virtualization instance manager 402. FIG. 8 depicts example steps for determining a virtualization classification of an application in accordance with an embodiment of the invention. At step 802, application information may be received. For example, the virtualization instance manager 402 may receive application information from the application, the application manager 214 (FIG. 2) and/or the system resources 220.

At step 804, it may be determined if the application information received at step 802 is sufficient to determine an application signature for the application. If the application information is sufficient, a procedure incorporating steps depicted in FIG. 8 may progress to step 806. Otherwise, the procedure may progress to step 808. At step 808, an attempt may be made to obtain additional application information. For example, the virtualization instance manager 218 (FIG. 2) may to obtain application information from the application, the application manager 214 and/or the system resources 220. At step 810, it may be determined if the additional information obtained (or not) at step 808 is sufficient to determine an application signature for the application. If the obtain application information is now sufficient, the procedure may progress to step 806. Otherwise, the procedure may progress to step 812.

At step 806, an application signature may be determined for the application. For example, the application classifier 408 (FIG. 4) may transform the application information with a cryptographic hash function. At step 810, the determined application signature may be matched against the application signature database 420. At step 816, it may be determined if a match for the determined application signature was found in the application signature database 420. If a match was found, the procedure may progress to step 818. Otherwise the procedure may progress to step 812.

At step 818, an application virtualization classification may be determined for the application based on the determined application signature. For example, the application signature database 420 (FIG. 4) may designate the application virtualization classification for each application with a matching application signature. If an application signature, or a matching application signature, can not be determined for the application, then, in this example, an application virtualization classification may be determined for the application, at step 812, based on one or more rules of the application classification rulebase 422. Such rules may make use of whatever application information was able to be obtained at step 802 and/or step 808. Although not shown in the example depicted in FIG. 8, the application virtualization classification may be based on any suitable combination of application information, application signature, information from the application signature database 420, and/or rules of the application classification rulebase 422.

Figure 9:
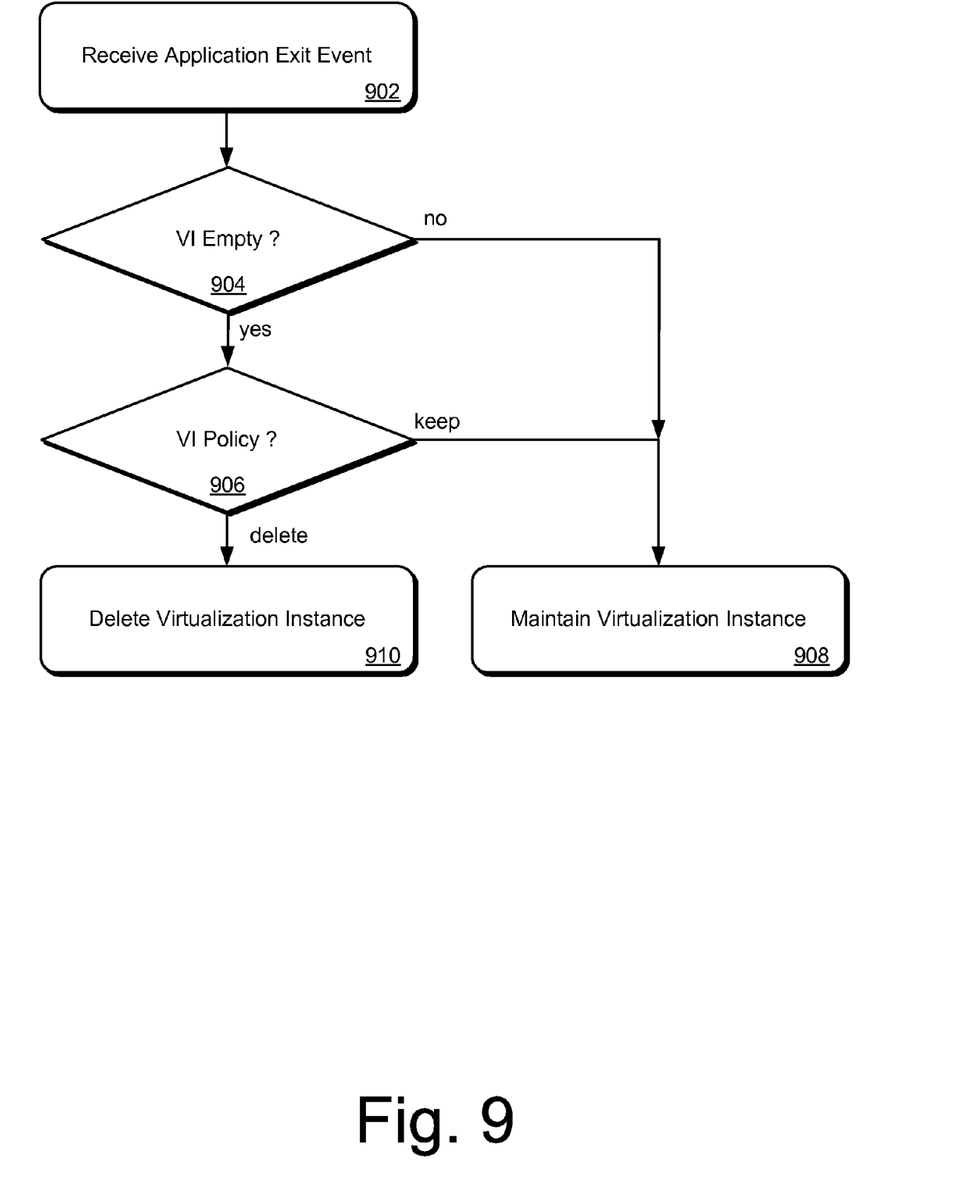
FIG. 9 is a flowchart depicting example steps for managing system virtualization instance lifetimes in accordance with an embodiment of the invention.

The virtualization instance manager 402 (FIG. 4) may manage lifetimes of system virtualization instances such as the system virtualization instances 318, 320, 322, 324 of FIG. 3. In particular, lifetimes of managed system virtualization instances may be independent of lifetimes of their contents, for example, lifetimes of applications 312, 314, 316. FIG. 9 depicts example steps for managing system virtualization instance lifetimes in accordance with an embodiment of the invention. At step 902, an application exit event may be received. For example, the virtualization instance manager 402 may be notified of an application exit event with the application event notification module 424.

At step 904, it may be determined if the system virtualization instance (VI) associated with the exited application is now empty (i.e., contains further applications). For example, in response to the application exit event, the virtualization instance manager 402 may update the application register 404 and the application-virtualization instance map 408, and query the application-virtualization instance map 408 to determine if the system virtualization instance associated with the exited application references any other applications. If the associated system virtualization instance is now empty, a procedure incorporating steps depicted by FIG. 9 may progress to step 906. Otherwise, the procedure may progress to step 908.

At step 906, it may be determined, based on the application virtualization instance policy 416 (FIG. 4), if the empty system virtualization instance should be kept or deleted. For example, the application virtualization instance policy 416 may specify that the specific system virtualization instance should be kept or deleted when empty, or that a specific class (including all) of system virtualization instances should be kept or deleted when empty. If it is determined that the empty system virtualization instance should be kept, the procedure may progress to step 908. Otherwise, the procedure may progress to step 910.

At step 910, the empty system virtualization instance may be deleted. For example, the virtualization instance manager 218 may instruct the virtualization service 216 to delete the empty system virtualization instance. Similarly, at step 908, the empty system virtualization instance may be maintained. For example, it may require an explicit instruction to the virtualization service 216 to maintain an empty system virtualization instance.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

The invention claimed is:

1. At least one computer-readable storage medium having thereon computer-executable instructions for system virtualization instance management comprising:
   instantiating a plurality of system virtualization instances in a session space provided by a server;
   determining a virtualization classification of an application, wherein the determining comprises:
      determining the virtualization classification of the application responsive to a match of an application signature of the application with a signature in an application signature database; and
      determining, responsive to failure to match the application signature of the application with the signature in the applications signature database, the virtualization classification of the application by operation of at least one rule in a rulebase; and
   allocating the application to a system virtualization instance from among the plurality of system virtualization instances, wherein the allocating is based at least in part on the virtualization classification of the application.

2. The at least one computer-readable storage medium of claim 1, wherein the determining of the virtualization classification additionally comprises determining the virtualization classification of the application in response to a request to instantiate the application in the system virtualization instance.

3. The at least one computer-readable storage medium of claim 2, wherein at least one system virtualization instance was instantiated prior to instantiation of a terminal session.

4. The at least one computer-readable storage medium of claim 3, wherein the application is allocated to one of the system virtualization instances that was instantiated prior to instantiation of the terminal session.

5. The at least one computer-readable storage medium of claim 1, wherein the application is a non-sequenced application.

6. The at least one computer-readable storage medium of claim 1, wherein allocating the application to one of the system virtualization instances comprises allocating the application to one of the system virtualization instances based on the virtualization classification of the application and a virtualization instance policy.

7. The at least one computer-readable storage medium of claim 1, wherein the computer-executable instructions further comprise determining an application signature for the application, and wherein determining the virtualization classification for the application comprises determining the virtualization classification based on, at least, the application signature.

8. The at least one computer-readable storage medium of claim 1, wherein determining the virtualization classification for the application comprises determining the virtualization classification based on, at least, application information provided by the application.

9. The at least one computer-readable storage medium of claim 1, wherein determining the virtualization classification for the application comprises determining the virtualization classification based on, at least, information obtained from the application.

10. The at least one computer-readable storage medium of claim 7, wherein the application signature for the application is determined by transforming information obtained from the application with a cryptographic hash.

11. The at least one computer-readable storage medium of claim 7, wherein at least one of the plurality of system virtualization instances is instantiated responsive to determining the virtualization classification for the application.

12. The at least one computer-readable storage medium of claim 1, wherein lifetimes of the system virtualization instances are independent of a lifetime of the application.

13. The at least one computer-readable storage medium of claim 1, wherein each system virtualization instance is associated with a unique identifier.

14. A method for system virtualization instance management comprising:
   receiving a request to instantiate a terminal session on a server that includes a system resource having a system global name space;
   instantiating a system virtualization instance in a session space of a server that is logically isolated from a system space of the server that stores the system resource, the system virtualization instance including a replica of the system global name space;
   determining application signatures for corresponding applications;
   determining corresponding virtualization classifications for the applications based on, at least, the application signatures, wherein for each application determining a corresponding virtualization classification comprises:
      determining the virtualization classification of the application responsive to a match of an application signature of the application with a signature in an application signature database; and
      determining, responsive to failure to match the application signature of the application with the signature in the applications signature database, the virtualization classification of the application by operation of at least one rule in a rulebase; and instantiating the applications within the system virtualization instance based on the virtualization classifications of the applications, the virtualization classifications indicating that events instantiated by the applications in the replica of the system global name space include non-conflicting event names.

15. The method of claim 14, further comprising receiving a request to instantiate an application originating within the terminal session, wherein the instantiating the applications includes instantiating the application in response to the request.

16. A system, comprising:
one or more processors;
a memory that includes a plurality of computer-executable components that are executable by the one or more processors to perform a plurality of actions, the plurality of actions comprising:
receiving a first request to instantiate a first application on a server that includes a system resource having a system global name space, the first application having a first application virtualization classification;
instantiating the first application within a system virtualization instance, the system virtualization instance including a virtual replica of the system global name space;
receiving a second request to instantiate a second application on the server, the second application having a second application virtualization classification;
determining, for each of the first and second applications, a virtualization classification, wherein the determining comprises:
determining the virtualization classification of the application responsive to a match of an application signature of the application with a signature in an application signature database; and
determining, responsive to failure to match the application signature of the application with the signature in the applications signature database, the virtualization classification of the application by operation of at least one rule in a rulebase;
determining, based at least in part on the first application virtualization classification and the second application virtualization classification, that the second application is resource name space compatible with the first application; and
in response, instantiating the second application within the system virtualization instance.

17. The system of claim 16, the plurality of actions further comprising:
instantiating an additional application within an additional system virtualization instance, the additional system virtualization instance including a an additional virtual replica of the system global name space; and
redirecting a modification of the system global name space by the additional application to the additional virtual replica of the system global name space so that the system global name space remains unchanged.

18. The system of claim 17, the plurality of actions further comprises instantiating the additional application in response to an additional request to instantiate the additional application on the server.

19. The at least one computer-readable storage medium of claim 7, further comprising a computer executable application classification rule base that includes a differential virtualization classification for each of a plurality of corresponding application signatures, wherein determining the virtualization classification for the application comprises matching the application signature to one of the corresponding application signatures.

20. The method of claim 14, further comprising:
receiving a plurality of requests to instantiate a plurality of second terminal sessions;
instantiating a plurality of system virtualization instances for the second terminal sessions; and
instantiating each second terminal session of the plurality of second terminal sessions within a corresponding system virtualization instance of the plurality of system virtualization instances.

* * * * *